June 24, 1924.
G. W. BOWEN
STOCKLESS ANCHOR
Filed Oct. 29, 1919
1,498,609
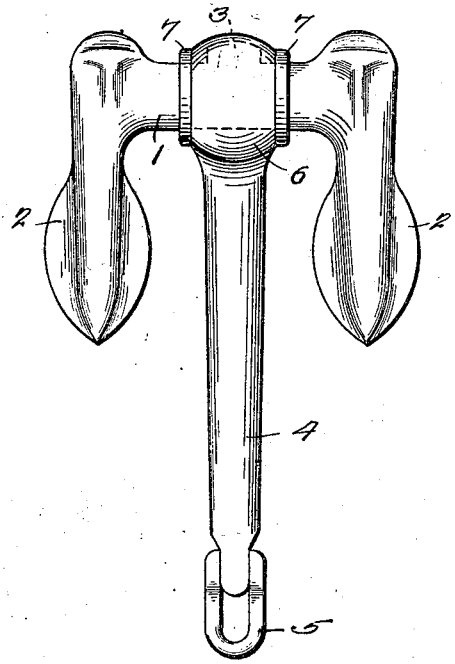
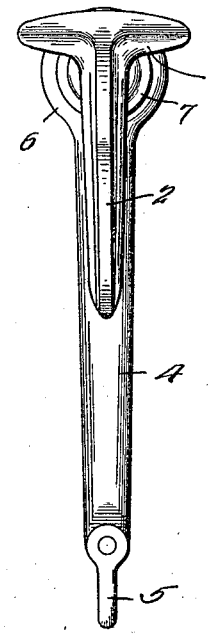
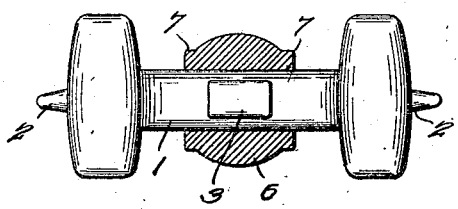
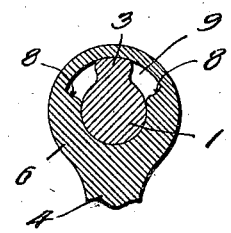
Inventor
Geo. W. Bowen
By
Elvin A. Clarkson
his atty.

Patented June 24, 1924.

1,498,609

UNITED STATES PATENT OFFICE.

GEORGE W. BOWEN, OF SWARTHMORE, PENNSYLVANIA.

STOCKLESS ANCHOR.

Application filed October 29, 1919. Serial No. 334,115.

*To all whom it may concern:*

Be it known that I, GEORGE W. BOWEN, a citizen of the United States, residing at Swarthmore, in the county of Delaware and State of Pennsylvania, have invented certain new and useful Improvements in Stockless Anchors, of which the following is a specification.

My invention contemplates a stockless anchor in which the head, flukes and shank are cast together, but with the shank and head capable of relative motions, whereby the use of pins, bolts and similar fasteners, to secure the shank and head together is eliminated, thus avoiding the shank and head assuming relative positions in which they would be inoperative.

In many types of stockless anchors the operative position of the shank, relative to the head, is dependent upon the pin bolt or the like, which pin sometimes becomes lost and permits the shank to assume a position relative to the head which destroys the function of a stockless anchor, in some instances the pin becomes bent, thereby binding the shank in the head of the anchor and preventing the shank from functioning; all of these objections are eliminated by the use of my invention.

In the drawing:

Figure 1 is a side elevation of the stockless anchor embodying my invention.

Figure 2 is an end elevation of the same.

Figure 3 is a bottom plan view of Figure 1.

Figure 4 is a detailed sectional view through the joint between the head and shank.

The reference numeral 1 designates the head of the anchor having integral flukes 2. The head of the anchor is provided with a lug 3, projecting from its rear face, the outer face of the lug being convex for a purpose to be hereinafter referred to.

The shank 4, is preferably round in cross section and provided at its free end with a shackle 5.

The lower end of the shank terminates in a spherical substantially hollow body 6, from the opposite sides of which project integral flanges 7. A recess 9 is formed in the cylindrical wall of the bearing having its outer wall concentric with the axis of the bearing and terminating at its ends in stop shoulders 8 to limit the swinging movement of the lug 3. The outer face of the lug 3 is convex in conformity with the arc of the recess 9.

It will be seen that the spherical body 4 completely encloses the joint between the head and shank, so that the working parts are not exposed, this spherical member may be made with or without peep holes, according to the desire of the manufacturer.

The two castings and shackle complete the anchor.

In making the anchor, according to my invention, I cast the shank and its spherical body and then mould the head of the flukes, with the head inside of the spherical body whereby one casting or the other becomes a part of the mould for the other casting. The part which forms the part of the mould of the casting is first coated with mould wash or other suitable material to prevent sticking and then the mould for the other part is formed around the same. Of course either part may be cast first.

The flanges 7 constitute an extended bearing surface between the shank and the head so as to eliminate any tendency to relative tilting motion between the shank and the head.

The anchor illustrated herein has passed the Lloyd's test in actual service.

What I claim is:

In a stockless anchor a shank terminating in its lower end in an integral bulbous head, functioning as a casing to enclose the joint between the shank and the flukes, and a bearing therein, projections extending laterally from either side of said head constituting an extension of the bearing in the head, an arcuate recess in said head beyond the line of the periphery of the bearing in the head, each end of said recess forming a stop, flukes connected by an integral head, a lug depending from said fluke head into said recess and adapted to move therein between said stops, said fluke head being mounted on the bearing in the bulbous head of the shank, and said extending projections.

In testimony whereof I affix my signature.

GEORGE W. BOWEN.